United States Patent [19]
Saunders

[11] 3,893,066
[45] July 1, 1975

[54] APPARATUS AND METHOD FOR ADJUSTING THE OUTPUT OF A PLURALITY OF GEOPHONES TO ELIMINATE THE EFFECT OF VARIATIONS IN THE NEAR SURFACE CHARACTER OF THE EARTH

[75] Inventor: Don A. Saunders, Houston, Tex.
[73] Assignee: Mark Products, Inc., Houston, Tex.
[22] Filed: Feb. 25, 1974
[21] Appl. No.: 445,534

[52] U.S. Cl. ................ 340/15.5 GC; 340/15.5 CP
[51] Int. Cl. ............................................. G01v
[58] Field of Search ............. 340/15.5 GC, 15.5 CP

[56] References Cited
UNITED STATES PATENTS

| | | | |
|---|---|---|---|
| 2,698,927 | 1/1955 | Parr, Jr. | 340/15.5 GC |
| 3,149,333 | 9/1964 | Campbell | 340/15.5 GC |
| 3,496,531 | 2/1970 | Sullivan et al. | 340/15.5 GC |
| 3,569,922 | 3/1971 | Parr, Jr. | 340/15.5 GC |
| 3,744,019 | 7/1973 | Schmitt | 340/15.5 GC |

Primary Examiner—Maynard R. Wilbur
Assistant Examiner—H. A. Birmiel
Attorney, Agent, or Firm—Bargfrede and Thompson

[57] ABSTRACT

A method and apparatus are disclosed that adjust the output of each individual properly planted geophone of a geophone spread or array to correct for differences in the seismic energy received by the geophones due to variations in the character of the earth near the surface below each geophone. This is accomplished by obtaining a signal from each geophone that is produced by ambient noise. The noise signal level for each geophone is compared to the level of a reference signal. The output of each geophone, then, is adjusted in accordance with the ratio of the magnitude of the noise signal level from that geophone and the reference signal level so that the output signal level of each geophone when subjected to seismic energy will have been adjusted individually to compensate for variations in input due to variations in the character of the earth near the geophone thereby causing the geophones to have substantially uniform responses.

7 Claims, 1 Drawing Figure

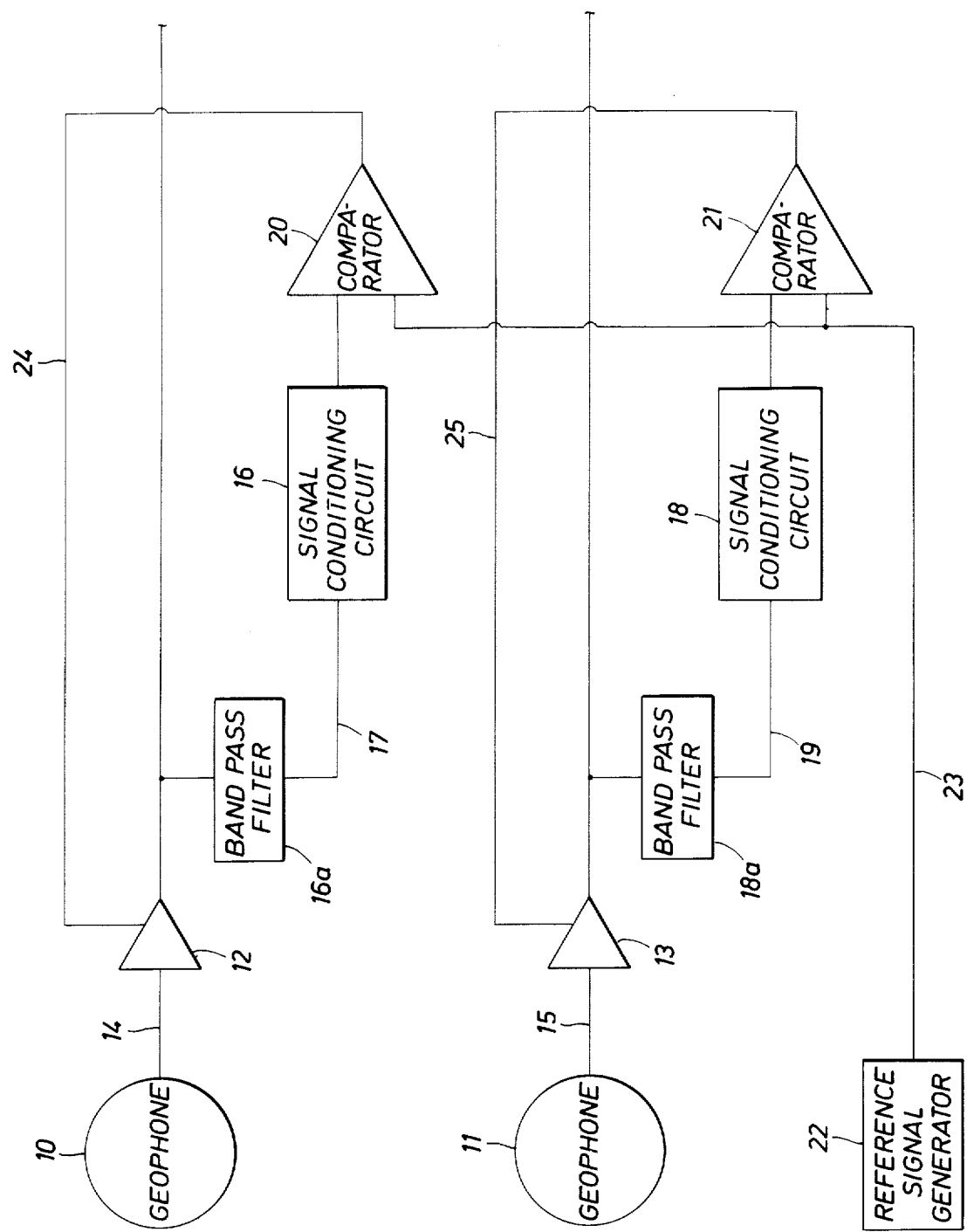

APPARATUS AND METHOD FOR ADJUSTING THE OUTPUT OF A PLURALITY OF GEOPHONES TO ELIMINATE THE EFFECT OF VARIATIONS IN THE NEAR SURFACE CHARACTER OF THE EARTH

This invention relates to geophysical prospecting utilizing the seismic technique, and more particularly to a method and apparatus for eliminating or reducing the effect of variations in the character of the earth near the surface below individual geophones in a spread.

In geophysical exploration utilizing seismic waves, a plurality of geophones or seismometers are located in spaced apart relationship in a preselected pattern or array on the earth's surface commonly called a "spread." Each geophone generates an electrical signal in response to the seismic energy transmitted to the geophone through the earth. Ideally, each geophone is in direct contact with the earth in such a manner that the level of the output signals for all of the geophones in a spread due to vertically traveling seismic energy is uniform. Unfortunately, however, when geophones are spread along the ground, the character of the earth near the surface below the geophones, commonly called the "weathered layer," often varies. Different near surface earth characteristics of the weathered layer usually have different seismic energy transmitting efficiencies which result in variations in the output signals of a geophone spread. For example, one or more geophones in a spread may be laying on unconsolidated or weathered material, whereas others are in direct contact with a good, energy transmitting formation, such as outcropping rock. This produces variations in the energy transmitted between the ground and the geophones and produces variations in the amplitude of the signals produced by the geophones, even when the same amount of seismic energy reaches the near subsurface of the ground upon which the geophones are resting. In the past, variations in the amplitude of the output of individual geophones was neglected and automatic gain control circuits were used to eliminate undesired amplitude variations in the summed output signals from each spread. Now, however, obtaining a signal from each geophone which has an amplitude that is a substantially accurate indication of the seismic energy received near the sub-surface below each geophone is considered very important in interpreting the information received from the geophones. Variations in the energy transmitting efficiency of the earth near the surface of the ground below the geophones in a spread is one of the major reasons for variations in the amplitude of the signals from the geophones and failure of arrays or spreads to suppress unwanted surface wave noise.

Therefore, it is an object of this invention to provide a method and apparatus for adjusting the output of each individual geophone of a geophone spread to compensate for variations in the character of the earth near the surface below the geophone so that the amplitude of the output signal of each geophone is a substantially accurate indication of the seismic energy received by the weathered layer below the geophone.

It is a further object of this invention to adjust the amplitude of the output of each geophone in an array so that the output of the array will have an amplitude that is indicative of the seismic energy received by the array.

It is a further object of this invention to so adjust the output of each geophone by using the ambient noise received by each geophone to indicate the energy transmitting efficiency of the weathered layer below the geophone.

These and other objects, advantages, and features of this invention will be apparent to those skilled in the art from a consideration of the specification, including the attached drawing and appended claims.

A block diagram is shown in the drawings of the preferred embodiment of the apparatus for practicing this invention.

The circuitry associated with only two geophones of an array is shown. It is to be understood that usually there are many more than two geophones used, however the circuitry for each will be the same as shown.

The outputs of geophones 10 and 11 are supplied to amplifiers 12 and 13 through conductors 14 and 15. In accordance with the method of this invention, a signal is obtained from each geophone that is produced by ambient noise. In the embodiment shown, such a signal is obtained by connecting the outputs of amplifiers 12 and 13 to signal conditioning circuits 16 and 18 through band pass filters 16a and 18a by conductors 17 and 19, respectively. Usually, the signal produced by a geophone due to ambient noise is relatively weak, even after being amplified. Therefore, means are provided to obtain a signal of sufficient strength for use that is proportional to the signal provided by the ambient noise. This may be accomplished in various ways. In the embodiment shown, signal conditioning circuits 16 and 18 perform arithmetic operations on the noise signals. First, the filters screen out any undesired frequencies. Next, the signals are squared in circuits 16 and 18. The squared signals are averaged. In some cases, it may be desirable to average the averaged squared signals. This signal is then sampled over a preselected period of time to obtain a noise signal for each geophone having a voltage sufficient for use in this correcting circuit. The period of time that the noise signals are sampled will vary, of course, with noise conditions. The ambient noise source level in the earth is presumed to be constant beneath each geophone in a spread. Therefore, the output signals from signal conditioners 16 and 18 will vary in proportion to the efficiency that the weathered layer below each geophone transmits the noise signal to each geophone. In other words, if the character of the earth below geophone 11 is such that more energy due to ambient noise is transmitted to it than to geophone 10, the signal produced by signal conditioner 18 will be proportionately greater than that of signal conditioner 16.

The next step of the method of this invention is to compare the noise signal of each geophone to a reference signal. In the embodiment shown, the outputs of signal conditioning circuits 16 and 18 are connected to comparator circuits 20 and 21. A reference signal is provided by reference signal generator 22 and connected to comparators 20 and 21 through conductor 23. The comparator circuits are designed to provide output signals that are proportional to the ratios of the levels of the noise signals to the reference signal level.

The next step of this invention is to adjust the output of each geophone in proportion to the ratio between the noise signal level for that geophone and the reference signal level so that the output signal of each geophone resulting from seismic energy will be adjusted individually to compensate for the character of the weathered layer below it. In the embodiment shown, the output signals of comparators 20 and 21 are connected to amplifiers 12 and 13 through conductors 24 and 25 to adjust the gains of the amplifiers so that the gain of each amplifier is proportional to the ratio of the level of the noise signal provided by the geophone connected to it and the reference signal level.

Thus, the gain of each of the amplifiers that are connected to each of the geophones is provided with a gain control setting signal that is proportional to the ratio of the noise signal level from each of the geophones and the reference signal level. Thus, the gain of each of the amplifiers associated with each geophone is such that the output from the amplifier is adjusted to compensate for the particular character of the earth near the surface below the geophone. After this step is accomplished, seismic energy can be transmitted into the ground in any conventional manner, as by an explosive charge, and when the seismic energy reaches the geophone array, the amplitude of the output signal of each geophone in the group will hve been automatically preadjusted by the present amount of gain of the amplifier connected to each geophone so that the amplitude of the output signal of each geophone of the group will be the same and a substantially accurate indication of the seismic energy reaching the surface layer of the earth below the geophone.

As a consequence of adjusting the output of each geophone in accordance with this invention, any variations in output signals of the geophones due to structural differences resulting from manufacturing tolerances is also substantially eliminated.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawing is to be interpreted as illustrative and not in a limiting sense.

The invention having been described, what is claimed is:

1. A method of adjusting the amplitude of the output of each of a plurality of geophones for variations in the energy transmitting character of the earth layer near the surface below the geophones comprising obtaining a signal level from each geophone that is produced by ambient noise, comparing the signal level from each geophone with a reference signal level, and adjusting the output of each geophone in proportion to the ratio of the noise signal level for that geophone and the reference signal level so that the output signal level of each geophone resulting from seismic energy will be a substantially accurate indication of the seismic energy reaching the surface earth layer below the geophone.

2. The method of claim 1 in which the noise signal is obtained by individually conditioning the signal from each geophone due to ambient noise and sampling the signal over a preselected period of time to obtain a signal of the desired level.

3. The method of claim 1 further provided with the step of amplifying the output signal of each geophone and in which the adjusting of each geophone output includes adjusting the amplification of the output in proportion to the ratio of the signal level to the reference signal level.

4. A method of adjusting the output of each of a plurality of geophones for variations in the energy transmitting character of the earth layer near the surface below the geophones, the signal produced by each geophone due to ambient noise over a preselected period of time to provide a signal level for each geophone that will vary from the noise signals from the other geophones in proportion to the variations in the energy transmitting character of the earth layer near the surface below the geophones, comparing the noise signal level of each geophone with a reference signal level, and using the ratio of the noise signal level to the reference signal level for each geophone to adjust the output of each geophone for such earth character differences between it and the other geophones so that the signals produced by all of the geophones will have amplitudes that are a substantially accurate indication of the seismic energy reaching the surface earth layer below the geophones.

5. Apparatus for adjusting the amplitude of the output of each of a plurality of geophones for variations in the energy transmitting character of the surface earth layer below the geophones comprising means providing a signal from each geophone due to ambient noise, means providing a reference signal, means for comparing the noise signal level from each geophone to the reference signal level and means responsive to the ratio of the two signals for adjusting the output of each geophone so that the output signal level of all of the geophones is of uniform amplitude.

6. The apparatus of claim 5 in which the noise signal providing means includes means for conditioning the output of the geophone due to ambient noise and means for sampling the signal over a preselected period of time.

7. Apparatus for adjusting the output of a plurality of geophones for variations in the energy transmitting ability of the weathered layer below the geophones, comprising means providing a signal from each geophone due to ambient noise, means providing a reference signal, means providing a correcting signal for each geophone that is proportional to the ratio of the noise signal level for the geophone and the reference signal level, and means responsive to the correcting signal for each geophone to provide a fixed adjustment to the output of the geophone that is independent of the seismic energy received so that the output of all the geophones will be substantially uniform although there are variations in the energy transmitting ability of the weathered layer below the geophones.

* * * * *